(12) United States Patent
Uematsu et al.

(10) Patent No.: US 11,162,914 B2
(45) Date of Patent: Nov. 2, 2021

(54) PRESSURE-RESISTANCE INSPECTION APPARATUS FOR VALVES AND ITS INSPECTION METHOD, AND HYDROGEN GAS DETECTION UNIT

(71) Applicant: KITZ CORPORATION, Chiba (JP)

(72) Inventors: Takeshi Uematsu, Yamanashi (JP); Naoki Kira, Yamanashi (JP)

(73) Assignee: KITZ CORPORATION, Chiba (JP)

( * ) Notice: Subject to any disclaimer, the term of this patent is extended or adjusted under 35 U.S.C. 154(b) by 214 days.

(21) Appl. No.: 16/306,263

(22) PCT Filed: Jun. 30, 2017

(86) PCT No.: PCT/JP2017/024161
§ 371 (c)(1),
(2) Date: Nov. 30, 2018

(87) PCT Pub. No.: WO2018/003977
PCT Pub. Date: Jan. 4, 2018

(65) Prior Publication Data
US 2019/0302045 A1    Oct. 3, 2019

(30) Foreign Application Priority Data

Jun. 30, 2016   (JP) .............................. JP2016-129882

(51) Int. Cl.
*G01N 27/12*   (2006.01)
*G01M 3/20*    (2006.01)
(Continued)

(52) U.S. Cl.
CPC .............. *G01N 27/12* (2013.01); *G01M 3/02* (2013.01); *G01M 3/04* (2013.01); *G01M 3/184* (2013.01); *G01M 3/20* (2013.01); *G01M 3/224* (2013.01)

(58) Field of Classification Search
CPC .......... G01M 3/04; G01M 3/18; G01M 3/184; G01M 3/22; G01M 3/224
See application file for complete search history.

(56) References Cited

U.S. PATENT DOCUMENTS 1,373,824 A  *  4/1921  McKenzie .......... G01M 3/2876
                                                 73/49.8
1,571,958 A  *  2/1926  Mueller .............. G01M 3/2876
                                                 73/46

(Continued)

FOREIGN PATENT DOCUMENTS

CN    102323013 A  *  1/2012
CN    101828101       2/2013
(Continued)

OTHER PUBLICATIONS

Machine Translation of JP-06235680-A Which Originally Published on Aug. 23, 1994. (Year: 1994).*

(Continued)

*Primary Examiner* — David A. Rogers
(74) *Attorney, Agent, or Firm* — Wenderoth, Lind & Ponack, L.L.P.

(57) ABSTRACT

Provided are a pressure-resistance inspection apparatus for valves and its inspection method, and hydrogen gas detection unit capable of detecting external leakage and specifying its position of occurrence even for valves with different sizes and shapes by performing pressure-resistance inspection with a simple structure quickly with high accuracy while preventing errors in test results, without requiring post-treatment for the valves, and also capable of mass processing by automation. Provided are a cover 2 in which a test valve 1 is accommodated in a state of being isolated from outside and a sensor 22 inside this cover 2 and capable of moving to a position close to an outer surface of the test (Continued)

valve 1 filled with a search gas. This sensor 22 is a gas sensor capable of detecting external leakage of the search gas from the test valve 1.

12 Claims, 9 Drawing Sheets (51) Int. Cl.
   *G01M 3/04* (2006.01)
   *G01M 3/02* (2006.01)
   *G01M 3/18* (2006.01)
   *G01M 3/22* (2006.01)

(56) References Cited

U.S. PATENT DOCUMENTS

| | | | | |
|---|---|---|---|---|
| 2,426,406 A * | 8/1947 | Meyers | G01M 3/2876 | 73/49.8 |
| 2,934,942 A * | 5/1960 | Carrie | G01M 3/2876 | 73/46 |
| 2,934,943 A * | 5/1960 | Carrie | G01M 3/2876 | 73/46 |
| 3,088,312 A * | 5/1963 | Morris | G01M 3/2876 | 73/46 |
| 3,490,269 A * | 1/1970 | Dallier | G01M 3/3281 | 73/49.2 |
| 3,633,406 A * | 1/1972 | Helms | G01M 3/04 | 73/45.5 |
| 3,765,225 A * | 10/1973 | Rivers | G01M 3/20 | 73/40.7 |
| 3,826,281 A * | 7/1974 | Clark | F16K 27/067 | 137/625.31 |
| 3,885,437 A * | 5/1975 | Reagan | G01N 1/2247 | 73/863.58 |
| 4,020,864 A * | 5/1977 | Church, Jr. | F16K 5/201 | 137/242 |
| 4,282,743 A * | 8/1981 | Pickett | G01M 3/223 | 73/40.7 |
| 4,317,796 A * | 3/1982 | Barr | G01N 27/16 | 422/95 |
| 4,432,227 A * | 2/1984 | Dunn | G01M 3/2876 | 73/46 |
| 4,443,791 A * | 4/1984 | Risgin | G08B 29/24 | 340/634 |
| 4,494,403 A * | 1/1985 | Bowers | B01D 46/0006 | 73/40.7 |
| 4,520,655 A * | 6/1985 | Owens | G01M 3/2876 | 73/46 |
| 4,583,394 A * | 4/1986 | Murakami | G01M 3/202 | 73/40.7 |
| 4,587,836 A * | 5/1986 | Hewlett | G01M 3/2876 | 73/46 |
| 4,663,964 A * | 5/1987 | Croce | G01M 3/363 | 73/49.3 |
| 4,667,506 A * | 5/1987 | Jenkins | G01M 3/3209 | 73/45.2 |
| 4,813,268 A * | 3/1989 | Helvey | G01M 3/205 | 73/40.7 |
| 5,010,761 A * | 4/1991 | Cohen | G01M 3/229 | 73/40.7 |
| 5,751,610 A * | 5/1998 | Gan | F22B 37/003 | 700/85 |
| 5,768,768 A * | 6/1998 | Best | B23Q 1/5481 | 29/33 J |
| 5,850,036 A * | 12/1998 | Giromini | G01M 3/202 | 73/40 |
| 5,889,199 A * | 3/1999 | Wong | G01M 3/227 | 250/343 |
| 6,065,736 A * | 5/2000 | Hunt | F16K 5/0678 | 137/246.22 |
| 6,176,248 B1 * | 1/2001 | Croke | B63B 13/00 | 114/198 |
| 6,279,384 B1 * | 8/2001 | Heikkinen | G01M 3/229 | 73/40.7 |
| 6,289,723 B1 * | 9/2001 | Leon | G01M 3/24 | 73/40.5 A |
| RE37,403 E * | 10/2001 | Howard | G01M 3/20 | 73/46 |
| 6,526,114 B2 * | 2/2003 | Paillaman | G21C 17/01 | 376/249 |
| 6,546,643 B2 * | 4/2003 | Lotze | G01B 21/045 | 33/503 |
| 6,722,185 B2 * | 4/2004 | Lawson | G01M 3/042 | 340/539.17 |
| 6,907,799 B2 * | 6/2005 | Jacobsen | G01N 29/045 | 73/865.8 |
| 6,972,677 B2 * | 12/2005 | Coulthard | G06Q 10/10 | 340/531 |
| 7,240,536 B2 * | 7/2007 | Beyer | F04D 19/04 | 73/40 |
| 7,271,894 B2 * | 9/2007 | Devitt | F01D 21/003 | 356/241.1 |
| 7,426,850 B2 * | 9/2008 | Takahashi | G01N 33/0009 | 73/31.05 |
| 7,788,967 B2 * | 9/2010 | Golding | G01M 3/226 | 73/40.5 A |
| 7,874,201 B2 * | 1/2011 | Grosse Bley | G01M 3/205 | 73/40.7 |
| 8,537,019 B2 * | 9/2013 | Rolff | G01M 3/205 | 340/605 |
| 8,617,489 B2 * | 12/2013 | Corso | B01L 3/502715 | 422/503 |
| 8,756,973 B2 * | 6/2014 | Wallace | G01B 21/045 | 73/1.79 |
| 9,952,044 B2 * | 4/2018 | Gatton | G01B 21/042 | |
| 10,073,001 B2 * | 9/2018 | Luedolph | G01M 3/20 | |
| 10,466,141 B2 * | 11/2019 | Harivel | G01N 1/2247 | |
| 10,571,357 B2 * | 2/2020 | Yamane | B25J 13/085 | |
| 10,613,020 B2 * | 4/2020 | Kane | G01N 19/08 | |
| 2003/0154768 A1 * | 8/2003 | Shioya | G01M 3/223 | 73/40.7 |
| 2004/0011117 A1 * | 1/2004 | Dutt | G01M 3/3218 | 73/48 |
| 2004/0244464 A1 * | 12/2004 | Hajdukiewicz | G01B 21/042 | 73/1.79 |
| 2005/0217370 A1 * | 10/2005 | Takahashi | G01N 33/0009 | 73/431 |
| 2007/0089489 A1 * | 4/2007 | Lewnard | B01D 53/228 | 73/38 |
| 2008/0060421 A1 * | 3/2008 | Muller | G01M 3/229 | 73/49.2 |
| 2009/0100909 A1 * | 4/2009 | Grosse Bley | G01M 3/229 | 73/40.7 |
| 2009/0210175 A1 * | 8/2009 | Bilpuch | G01M 3/24 | 702/51 |
| 2010/0107569 A1 * | 5/2010 | Havemann | B29C 66/83221 | 53/479 |
| 2011/0113861 A1 | 5/2011 | Maehira et al. | | |
| 2012/0060385 A1 * | 3/2012 | Hunter | G01B 21/04 | 33/503 |
| 2012/0260722 A1 * | 10/2012 | McGregor | G01M 3/207 | 73/40.7 |
| 2013/0167618 A1 * | 7/2013 | Grosse Bley | A47L 15/4212 | 73/40 |
| 2014/0354426 A1 * | 12/2014 | Luybyanitsky | G08B 21/20 | 340/539.26 |
| 2015/0276542 A1 * | 10/2015 | Bowen | G01M 3/103 | 73/45.6 |
| 2015/0316440 A1 * | 11/2015 | Fisk | G01M 3/229 | 73/40.7 |
| 2016/0084730 A1 * | 3/2016 | Wakayama | G01M 3/24 | 73/40 |
| 2016/0116364 A1 * | 4/2016 | Vaccaro | G01M 3/229 | 73/40.7 |
| 2016/0116365 A1 * | 4/2016 | Luedolph | G01M 3/202 | 73/40.7 |
| 2016/0223425 A1 * | 8/2016 | Liu | G01M 3/329 | |

(56) References Cited

U.S. PATENT DOCUMENTS

| | | | | |
|---|---|---|---|---|
| 2017/0160236 A1* | 6/2017 | Uhlig | ............... | G01N 27/87 |
| 2018/0143096 A1* | 5/2018 | Hawkins | ............... | C25B 1/08 |
| 2018/0143098 A1* | 5/2018 | Yamane | ............... | G01M 3/2815 |

FOREIGN PATENT DOCUMENTS

| | | | | | |
|---|---|---|---|---|---|
| CN | 103630698 | | 3/2014 | | |
| JP | 59010831 | A * | 1/1984 | ............ | G01M 3/04 |
| JP | 60082829 | A * | 5/1985 | ............ | G01M 3/24 |
| JP | 02243934 | A * | 9/1990 | | |
| JP | 5-2045 | | 1/1993 | | |
| JP | 06235680 | A * | 8/1994 | | |
| JP | 07-270270 | | 10/1994 | | |
| JP | 08015203 | A * | 1/1996 | | |
| JP | 10-038832 | | 2/1998 | | |
| JP | 2008-224359 | | 9/2008 | | |
| JP | 2011-107034 | | 6/2011 | | |
| JP | 2011-179975 | | 9/2011 | | |

OTHER PUBLICATIONS

Machine Translation of CN-102323013-A Which Originally Published on Jan. 18, 2012. (Year: 2012).*

Machine Translation of JP 05-002045 U Which Originally Published On Jan. 14, 1993. (Year: 1993).*

Inficon, The Importance of High Flow in Robotic Leak Testing, available on the internet at https://newsletters.inficon.com/AUTOTEST/March2018/RoboticSniffing.html, Mar. 2018. (Year: 2018).*

International Search Report dated Sep. 12, 2017 in International (PCT) Application No. PCT/JP2017/024161.

Chinese Office Action dated Apr. 28, 2020 in corresponding Chinese Patent Application No. 201780040792.7 with English translation.

* cited by examiner

PRESSURE-RESISTANCE INSPECTION APPARATUS FOR VALVES AND ITS INSPECTION METHOD, AND HYDROGEN GAS DETECTION UNIT

TECHNICAL FIELD

The present invention relates to pressure-resistance inspection apparatus for valve boxes of various valves such as, for example, ball valves and globe valves, and their inspection methods and, in particular, relates to a pressure-resistance inspection apparatus for valves and its inspection method, and hydrogen gas detection unit capable of performing pressure-resistance inspection with a simple structure quickly with high accuracy.

BACKGROUND ART

Conventionally, high pressure resistance is required for valves. As pressure tests at the time of manufacture, a valve-box pressure-resistance test (shell test) for checking strength of a pressure-resistant part and the presence or absence of a leak, a valve-seat leak test for checking the presence or absence of a leak from the valve seat (seat test), and so forth are performed. By these, valves before shipping are inspected. Among these, as a valve-box pressure-resistance test, pressure-resistance inspection is performed with, for example, a water bubble leak method, a sniffer method, a vacuum chamber method, or the like. In the water bubble leak method, a test piece with its inside pressurized by gas is immersed in water, and a leak is detected with bubbles from the inside of the test piece. In the sniffer method, a search gas is put inside a test piece, and a probe is made close to the gas flowing to the outside of the test piece to detect a leak by this probe. Also, in the vacuum chamber method, a test piece is accommodated inside a vacuum chamber, a search gas is put inside the test piece, and a gas flowing from the test piece to the vacuum chamber is detected.

On the other hand, in a leak detection apparatus for containers in PTL 1, a technique is disclosed in which a sensor wall having many gas sensors arranged in a hollow apparatus main body is provided and a leak of gas injected into a container under test accommodated in the apparatus main body is monitored by the gas sensors.

According to this technique, sensing by many gas sensors can detect, in addition to occurrence of gas leakage, a leak location of the container under test.

CITATION LIST

Patent Literature

PTL 1: Japanese Utility-Model Application Laid-Open No. 5-2045

SUMMARY OF INVENTION

Technical Problem

However, when a valve is inspected with the valve-box pressure-resistance test through the water bubble leak method described above, skill is required because air bubbles from the inside of the valve as a test piece are checked by visual inspection. Depending on the worker, there is also a possibility of failing to find occurring bubbles. Therefore, errors may occur in the inspection results. Moreover, after inspection, post-treatment such as removal of water droplets attached to the valve is required, thereby making the structure of the test apparatus complex and also making automation difficult. In the case of the sniffer method, even when a leak occurs from the inside of the valve, measurement is difficult if the probe does not directly touch that leak position. This poses problems of taking time for inspection for the entire test piece and also requiring skill for probe operation. In the case of the vacuum chamber method, a time until a vacuum state is required at the time of inspection, and therefore efficiency of inspection is poor. Moreover, even if a leak occurs, its leak position cannot be specified. Furthermore, vacuum suction causes a flow of air, and therefore a change in temperature may occur inside the chamber to decrease sensitivity of the sensor.

On the other hand, in the case of the leak detection method for containers of PTL 1, which will be described further below, a gap between the sensor wall and the container under test is narrow. Therefore, a gas leaked from the container under test may be locally retained and may not reach the sensor, thereby disabling leak sensing. When the container under test is completely covered with the sensor wall, a flow of gas that tries to be leaked from the container under test is hindered, and thus a leak may not be able to be sensed.

In addition to these demerits, when this leak detection method is applied to valves, since each valve has a different shape and size as a product under test depending on its type, nominal pressure, nominal diameter, and so forth, a somewhat large sensor wall is required to support these differences. However, if the test piece is small compared with the sensor wall, a distance between this test piece and the sensor may be too wide to disable leak sensing.

The present invention has been developed to solve the conventional problems, and has an object of providing a pressure-resistance inspection apparatus for valves and its inspection method, and hydrogen gas detection unit capable of detecting external leakage and specifying its position of occurrence even for valves with different sizes and shapes by performing pressure-resistance inspection with a simple structure quickly with high accuracy while preventing errors in test results, without requiring post-treatment for the valves, and also capable of mass processing by automation.

Solution to Problem

To achieve the object described above, the invention according to claim 1 is directed to a pressure-resistance inspection apparatus for valves including a cover in which a test valve is accommodated in a state of being isolated without being sealed from outside and a sensor inside this cover and capable of moving in an approaching direction to a position close to an outer surface of the test valve filled with a search gas, this sensor being a gas sensor movable to a retention region of the search gas externally leaked from the test valve.

The invention according to claim 2 is directed to the pressure-resistance inspection apparatus for valves, in which the gas sensor is a hydrogen sensor capable of detecting external leakage of hydrogen in a mixture gas of hydrogen and nitrogen formed of a gas containing hydrogen, which is the search gas with which inside of the test valve is filled.

The invention according to claim 3 is directed to the pressure-resistance inspection apparatus for valves, in which the cover is formed in a cylindrical shape so that flange parts formed on both sides of the test valve formed of a ball valve can be disposed at upper and lower positions, and the gas sensor is provided so as to be movable in a retention region of the search gas on a back surface of the flange part disposed at the upper position.

The invention according to claim 4 is directed to the pressure-resistance inspection apparatus for valves, in which a stem of the test valve formed of a globe valve is provided so as to be mountable in an upwardly-oriented state, and the gas sensor is provided so as to be movable in a retention region of the search gas near a cap part attached above the glove valve.

The invention according to claim 5 is directed to the pressure-resistance inspection apparatus for valves, in which the apparatus has a flange-shaped jig by which the flange parts formed on both sides of the test valve are clamped in a sealed state, and the cover is provided so as to be able to make reciprocating movements in a clamping direction so as to be able to isolate the test valve from outside or expose the test valve to outside, with a clamped state of the flange parts by the jig.

The invention according to claim 6 is directed to the pressure-resistance inspection apparatus for valves, in which the gas sensor has attached thereto a rotation driving device capable of making angle adjustment in a direction of approaching or departing from the test valve.

The invention according to claim 7 is directed to the pressure-resistance inspection apparatus for valves, in which the cover is provided with an exhaust fan which exhausts a gas inside the cover.

The invention according to claim 8 is directed to a pressure-resistance inspection method for valves, in which a test valve is accommodated in a cover in a state of being isolated without being sealed from outside, a gas sensor is moved in an approaching direction to a retention region of a search gas, which is a position close to an outer surface of a joint part of components serving as this test valve, and, when the test valve is filled with the search gas, external leakage of the search gas from the test valve is detected.

The invention according to claim 9 is directed to the pressure-resistance inspection method for valves, in which the gas sensor is a hydrogen sensor capable of detecting external leakage of hydrogen in a mixture gas of hydrogen and nitrogen formed of a gas containing hydrogen, which is the search gas with which inside of the test valve is filled.

The invention according to claim 10 is directed to a hydrogen gas detection unit for use in the pressure-resistance inspection apparatus for valves, in which a plurality of hydrogen sensors are connected to a digital potentiometer, and the unit has an adjustment function of adjusting reference voltages of these hydrogen sensors at a certain value via a microprocessor.

The invention according to claim 11 is directed to the hydrogen gas detection unit, in which the microprocessor has a function of setting a voltage for determination by, when the reference voltages of the respective hydrogen sensors are varied, adjusting each of these varied variable voltages with the digital potentiometer, and setting a voltage for sensing hydrogen for this voltage for determination.

The invention according to claim 12 is directed to the hydrogen gas detection unit, in which the microprocessor has a function of storing a resistance value of the test valve measured by the digital potentiometer, starting adjustment of the resistance value for a next test valve for inspection based on this resistance value, thereby reducing a time to be taken for setting the reference voltage of each of the hydrogen sensors.

Advantageous Effects of Invention

From the invention according to claim 1, the apparatus has a cover in which a test valve is accommodated in a state of being isolated from outside and a sensor inside this cover and capable of moving to a position close to an outer surface of the test valve, and the sensor is a gas sensor capable of detecting external leakage of the search gas such as hydrogen from the test valve. Thus, even for valves with different sizes and shapes, with a simple structure, the gas sensor is made close to the outer surface of the joint part of components where external leakage of the test valve may occur, and pressure-resistance inspection is performed quickly with high accuracy while errors in test results are prevented, thereby allowing external leakage to be detected and also its position of occurrence to be specified by the gas sensor. Unlike pressure-resistance inspection of a water bubble leak type, post-treatment for the valve such as removal of water droplets is not required, and therefore automation can be made, and successive mass processing can also be performed.

From the invention according to claim 2, the gas sensor is a hydrogen sensor capable of sensing external leakage of hydrogen in a mixture gas of hydrogen and nitrogen formed of a gas containing hydrogen, which is the search gas. Thus, hydrogen is safely retained around the test valve at the time of occurrence of external leakage and, by using this property, even subtle external leakage is accurately detected.

From the invention according to claim 3, with the cover formed in a cylindrical shape, while the flange parts on both sides of the test valve are arranged at predetermined positions inside the cover as being disposed at upper and lower positions, and pressure-resistance inspection is performed on this test valve in a state in which the gas senor is moved to the retention region of the search gas on the back surface of the flange part disposed at the upper position. Thus, in particular, external leakage from the outer surface of the joint part below the upper flange part can be reliably detected.

From the invention according to claim 4, the test valve formed of a globe valve is accommodated inside the cover with the stem being in an upwardly-oriented state, the leaked search gas is accumulated in the retention region of this test valve, and pressure-resistance inspection is performed by making the gas sensor close thereto to allow reliable detection of external leakage.

From the invention according to claim 5, by clamping the flange parts on both sides of the test valve by a flange-shaped jig, pressure-resistance inspection can be performed in a state in which an unnecessary leak between the flange part and the jig is prevented. In the clamped state by the jig, the test valve can be isolated from outside or exposed, thereby preventing leakage of the gas to the outside of the cover and also facilitating attachment and detachment of the test valve. This allows valves under test to be successively attached to and detached from the cover, and automation of pressure-resistance inspection can also be made.

From the invention according to claim 6, the angle of the hydrogen sensor can be adjusted by a rotation driving device such as a servo motor in a direction of an approaching or departing from the test valve. Thus, even for a test valve having an outer surface in an uneven shape, the hydrogen sensor is made close to a position where external leakage may occur to detect a leak with high accuracy. On the other hand, by operating the hydrogen sensor to a direction of departing from the test valve, the test valve can be arranged at a predetermined position inside the cover or can be easily removed from the cover, without this hydrogen sensor getting out of the way.

From the invention according to claim 7, hydrogen inside the cover is exhausted to outside by the exhaust fan to prevent retention of hydrogen after external leakage inspection. Even when pressure-resistance inspection is successively performed on different valves under test by using the same cover, the presence or absence of external leakage, its position of occurrence, and the amount of leakage are accurately detected.

From the invention according to claim 8, a valve with a different size and shape is accommodated inside the cover, and for this valve, while errors in test results are prevented with a simple structure having a gas sensor, external leakage and its position of occurrence can be detected quickly with high accuracy. Unlike inspection of a water bubble leak type, post-treatment for the valve such as removal of water droplets is not required, and therefore automation can be made, and successive mass processing can also be performed.

From the invention according to claim 9, hydrogen is safely retained around the test valve at the time of occurrence of external leakage and, by using this property, even subtle external leakage is accurately detected.

From the invention according to claim 10, with the reference voltages of the plurality of hydrogen sensors being adjusted at a certain value, sensitivities of the hydrogen sensors are equalized to allow a hydrogen gas to be detected with high accuracy.

From the invention according to claim 11, different reference voltages of the respective hydrogen sensors can be adjusted and, to this reference voltage, a voltage for determination for reliably detecting external leakage can be set.

From the invention according to claim 12, a resistance value of the test valve is stored and, based on this resistance value, adjustment of the resistance value is started for a next test valve. Thus, processes until the value reaches near the resistance value for the next test valve are omitted, a time to be taken for setting a reference voltage of the hydrogen sensor is reduced, and efficiency of inspection when automated can be enhanced.

DESCRIPTION OF EMBODIMENTS

In the following, the pressure-resistance inspection apparatus for valves and its inspection method, and hydrogen gas detection unit in the present invention are described in detail based on embodiments.

Figure 1:
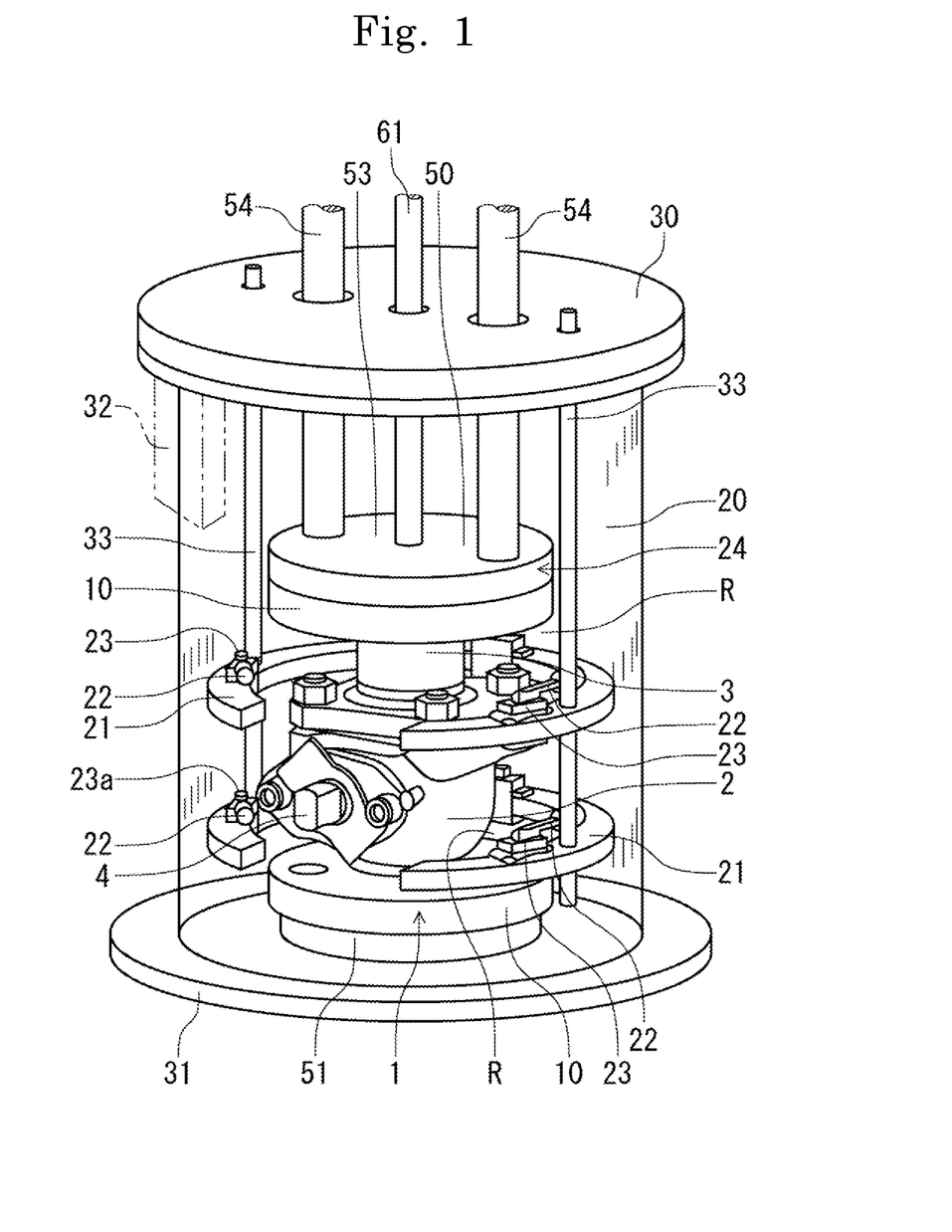
FIG. 1 is a perspective view of a pressure-resistance inspection apparatus for valves of the present invention.
Figure 2:
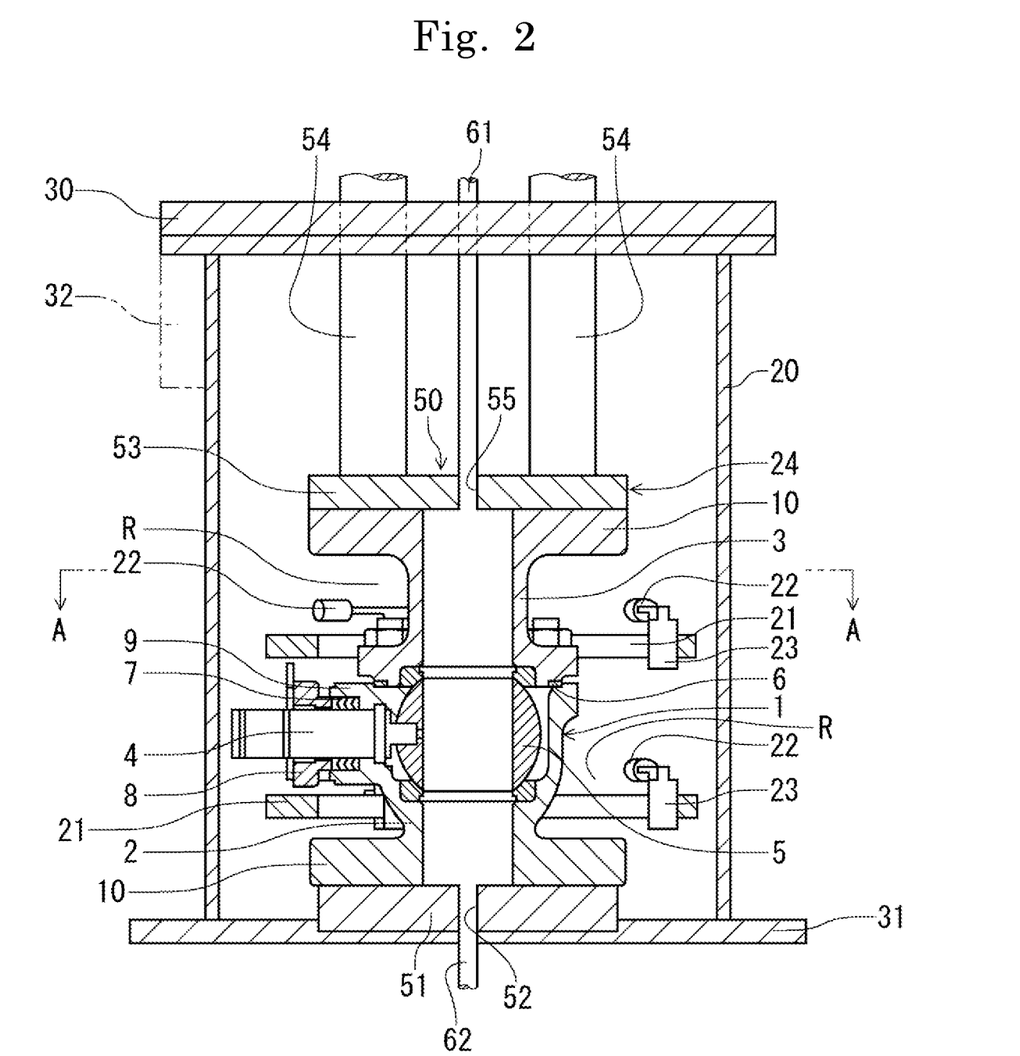
FIG. 2 is a center longitudinal sectional view of FIG. 1.

Depicted in FIG. 1 is a perspective view of the pressure-resistance inspection apparatus for valves of the present invention, and FIG. 2 depicts a center longitudinal sectional view of FIG. 1. The pressure-resistance inspection apparatus for valves of the present invention is used for a valve-box pressure-resistance test (pressure-resistance inspection) by filling a test valve as an inspected subject with a gas containing hydrogen and detecting a leak of hydrogen from this test valve to outside.

As depicted in FIG. 1 and FIG. 2, a test valve 1 is formed of, for example, a ball valve. This ball valve 1 has a body part 2 and a cover part 3, and is configured, in a state in which a stem 4, a ball 5, and so forth are incorporated inside, by integrating these body part 2 and cover part 3. A gasket 6 is attached to a joint portion between the body part 2 and the cover part 3, which is sealed therebetween by this gasket 6. The stem 4 is rotatably attached via a laminated packing 7 by a gland member 8 inside a neck part 9. The packing 7 seals the space between the body part 2 and the stem 4, and the gland member 8. On both sides of the valve 1, flange parts 10, 10 are formed, and the valve has an outer surface in an uneven shape including these flange parts 10.

At the time of pressure-resistance inspection, as a gas (search gas) with which the above-described test valve 1 is to be filled, any of gases containing hydrogen is used, for example. Of these, a mixture gas containing 5% hydrogen as a tracer gas with diffusibility and 95% nitrogen as an inert gas is used. This mixture gas has a property of being leaked from a joint part between the body part 2 and the cover part 3 and near an attachment part of the gland member 8 described above, which are components forming the test valve 1. when external leakage is present at the time of a pressure-resistance test. The gas with 5% hydrogen is a nonflammable high-pressure gas, and is thus usable safely. As the search gas, in addition to the gas containing hydrogen, any of various gases can be used. For example, also when a helium gas or methane gas is used, diffusibility is high, as with the hydrogen-containing mixture gas.

In FIG. 1 and FIG. 2, the pressure-resistance inspection apparatus for valves of the present invention has a cover 20, arc-shaped plate members 21, sensors 22, rotation driving devices (in the present embodiment, servo motors) 23, and a jig 24, and is used when a valve-box pressure resistance test on the test valve 1 is performed.

The cover 20 is formed in a cylindrical shape of, for example, a resin material such as a transparent or translucent acrylic resin, and the diameter of this cylindrical portion is provided so as to be larger than the flange parts 10 on both sides of the test valve 1. This allows the test valve 1 to be accommodated inside the cover 20, with the flange parts 10 disposed at upper and lower positions. In this case, when external leakage occurs from the joint portion between the body part 2 and the cover part 3 of the test valve 1, a back surface side of the flange part 10 positioned above serves as a retention region R for hydrogen. Near this retention region R, hydrogen leaked from below the flange part 10 tends to be particularly accumulated. It is assumed that this cover 20 can be used also for valves with different sizes and shapes.

On an upper end side of the cover 20, an upper side plate 30 is fixedly attached. On the other hand, on a lower end side of the cover 20, a lower side plate 31 is provided so as to be able to make contact with and leave from the cover 20. With these side plates 30 and 31, the inside of the cover 20 is covered to have a chamber function. When the test valve 1 is accommodated inside the cover 20, this test valve 1 becomes in a state of being isolated from outside. Here, since the lower end of the cover 20 is not closely attached to the lower side plate 31, the inside of the cover 20 communicates outside air, thereby causing a flow of air to some extent inside the cover 20 and preventing local retention of hydrogen. This facilitates detection of external leakage by the sensors 22, which will be described further below.

In this manner, the "state of being isolated from outside" in the present invention does not mean that the inside of the cover 20 becomes in a hermetically-sealed state, but refers to a state in which influences such as outside wind over the test valve 1 are prevented and a flow of gas inside the cover 20 is allowable to a degree that hydrogen leaked from the test valve 1 reaches the sensor 22 within an inspection time.

The cover 20 is preferably provided with an exhaust fan 32 for exhausting gas such as the mixture gas left inside this cover 20. In this case, in the drawing, the exhaust fan 32 is preferably attached to the upper side of the cover 20 and, here, hydrogen, which is lighter than air, is efficiently exhausted by the exhaust fan 32.

Figure 4:
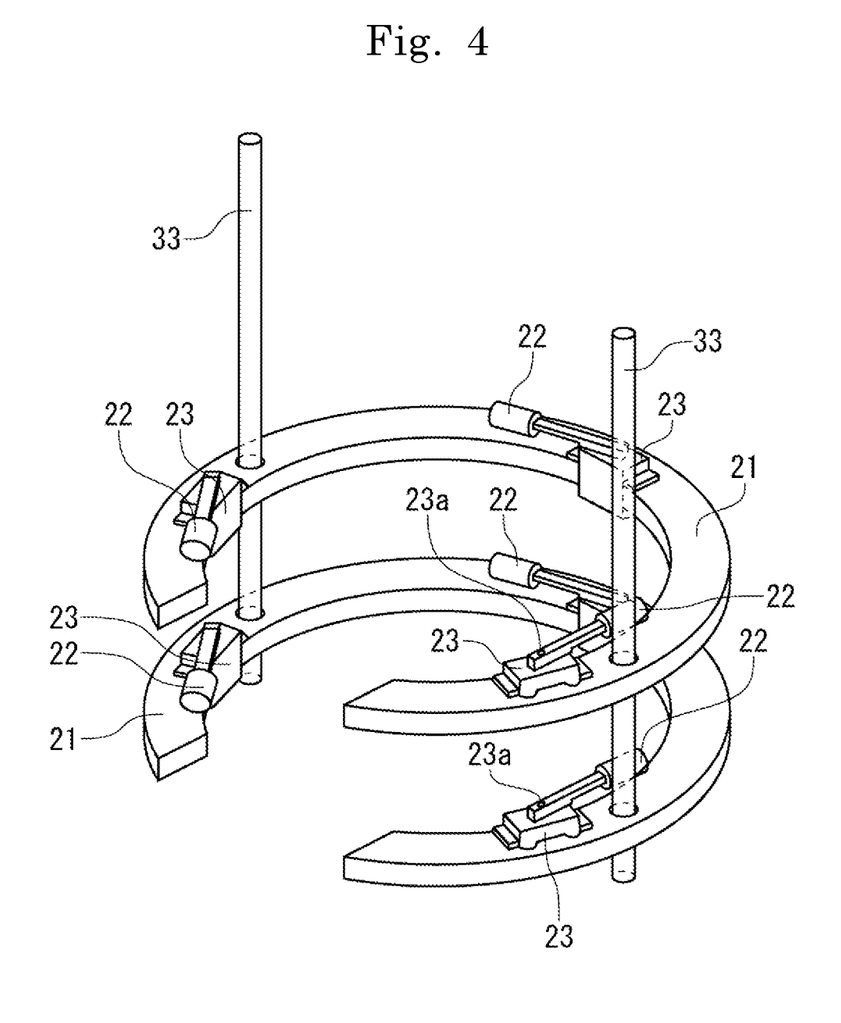
FIG. 4 is a perspective view depicting an attachment state of the sensors and motors.

As depicted in FIG. 4, the arc-shaped plate members 21 are each formed in an arc shape of a letter C with a size allowing the test valve 1 to be inserted to an inner peripheral side, and are positioned and fixed at two locations by rod-shaped holding members 33, 33 mutually in a substantially parallel state at a predetermined height inside the cover 20. This causes, with vertical movements of the cover 20, the arc-shaped members 21 to also vertically move integrally with this cover 20. Each arc-shaped plate member 21 includes the sensors 22 equidistantly at three locations.

The sensors 22 are each formed of a gas sensor of a hydrogen sensor which can detect external leakage of hydrogen, which is a search gas from the test valve 1, and this hydrogen sensor 22 is provided so as to be movable to a position close to the outer surface of the test valve 1 filled with the gas containing hydrogen. This allows detection of external leakage of hydrogen in the mixture gas of hydrogen and nitrogen with which the inside of the test valve 1 is filled. When a helium gas is used as a search gas, a gas thermal conduction sensor is preferably used.

Figure 3:
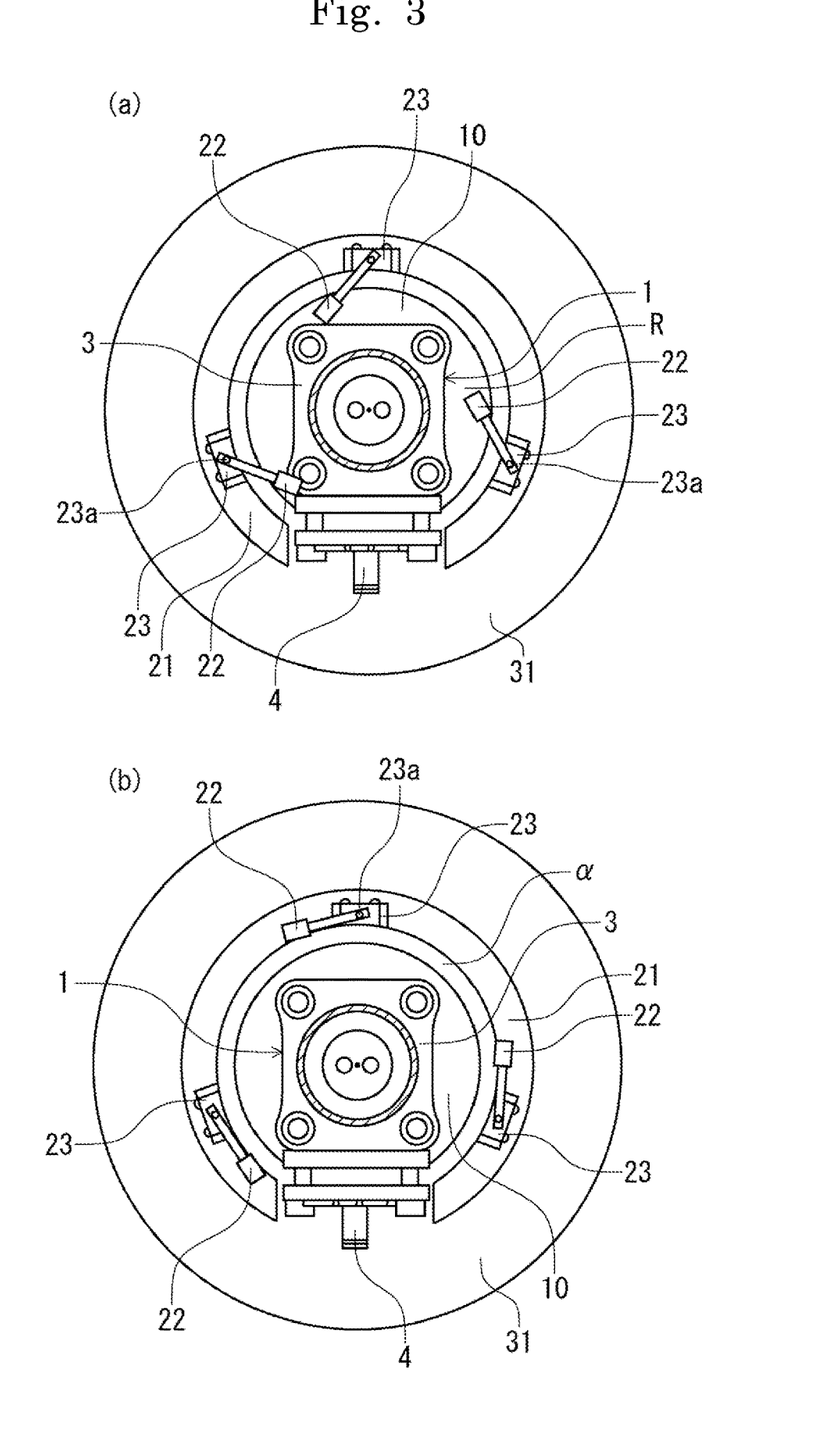
FIG. 3 is an A-A sectional view of FIG. 2, in which (a) is an A-A sectional view depicting a state in which sensors approach and (b) is an A-A sectional view depicting a standby state of the sensors.

As depicted in FIG. 4, the hydrogen sensor 22 is attached to a rotation shaft 23*a* provided to the servo motor 23 fixed to the arc-shaped plate member 21, and is provided, as depicted in FIG. 3(*a*) and FIG. 3(*b*), so as to be rotatable by rotating the rotation shaft 23*a* in a direction of approaching or departing from the test valve 1 attached to the inner peripheral side of the arc-shaped plate members 21 so that the angle with respect to the test valve 1 is adjustable. Depicted in FIG. 3(*a*) is a state in an A-A cross section of FIG. 2 in which a hydrogen measuring site of each hydrogen sensor 22 is moved (rotated) to a position close to the outer surface of the test valve 1 at the time of pressure-resistance inspection, and depicted in FIG. 3(*b*) is a standby state of the hydrogen sensors 22 in the A-A cross section of FIG. 2. Here, a space a serves as a gap between the arc-shaped plate member 21 having the hydrogen sensors 22 attached thereto and the test valve 1. While a contact between the hydrogen sensors 22 and the test valve 1 is avoided, the test valve 1 can be attached to and detached from the cover 20.

While hydrogen is known as a gas with diffusibility, as a comparison example, the hydrogen sensors 22 were arranged only above the inside of the cover 20 in FIG. 1 and FIG. 2 and external leakage was intentionally caused near the gland member 8 by using a mixture gas of 5% hydrogen and 95% nitrogen, but was not be able to be detected by the hydrogen sensors 22 within a predetermined inspection time. By contrast, when the hydrogen sensor 22 were gradually made close to the test valve 1, it was found that the above-described mixture gas was retained at a portion where the external leakage occurred. That is why the hydrogen sensors 22 are moved to positions close to the outer surface of the test valve 1, as described above.

And, as described above, in the test valve 1 depicted in FIG. 1 and FIG. 2, the back surface side of the flange part 10 positioned above provides a so-called umbrella function, and leaked hydrogen tends to be accumulated. Therefore, it is suitable that the hydrogen sensors 22 are rotationally adjusted by the servo motors 23 and are then made close to the outer periphery of the test valve 1 near this retention region R.

In the present embodiment, in this retention region R, three hydrogen sensor 22 are arranged at intervals of substantially 120 degrees and three more hydrogen sensors 22 are arranged at intervals of substantially 120 degrees above the flange part 10 positioned below and at a height close to the gland part 8, and thus six hydrogen sensors 22 in total are used.

Here, the above-described hydrogen sensors 22 are described in detail. The hydrogen sensors 22 in the present embodiment are each formed of a module which outputs, with application of a predetermined voltage, a voltage in accordance with the concentration of externally-leaked hydrogen. Before pressure-resistance inspection, it required to perform fine sensitivity adjustment by changing the output voltage by a control for resistance adjustment, in accordance with a warm-up state of the hydrogen sensors 22 and a change in atmospheric concentration of hydrogen. When this sensitivity adjustment is manually performed, the adjustment is cumbersome and also hinders automation.

Also, to sense a subtle leak, detection requires time if one hydrogen sensor 22 is used.

From these factors, as described above, six hydrogen sensors 22 are controlled respectively by the servo motors 23. Here, resistance adjustment of six hydrogen sensors 22 is approximately simultaneously performed by microprocessor control. As a rotation driving device, another device other than a servo motor may be used, such as a stepping motor not depicted.

Figure 6:
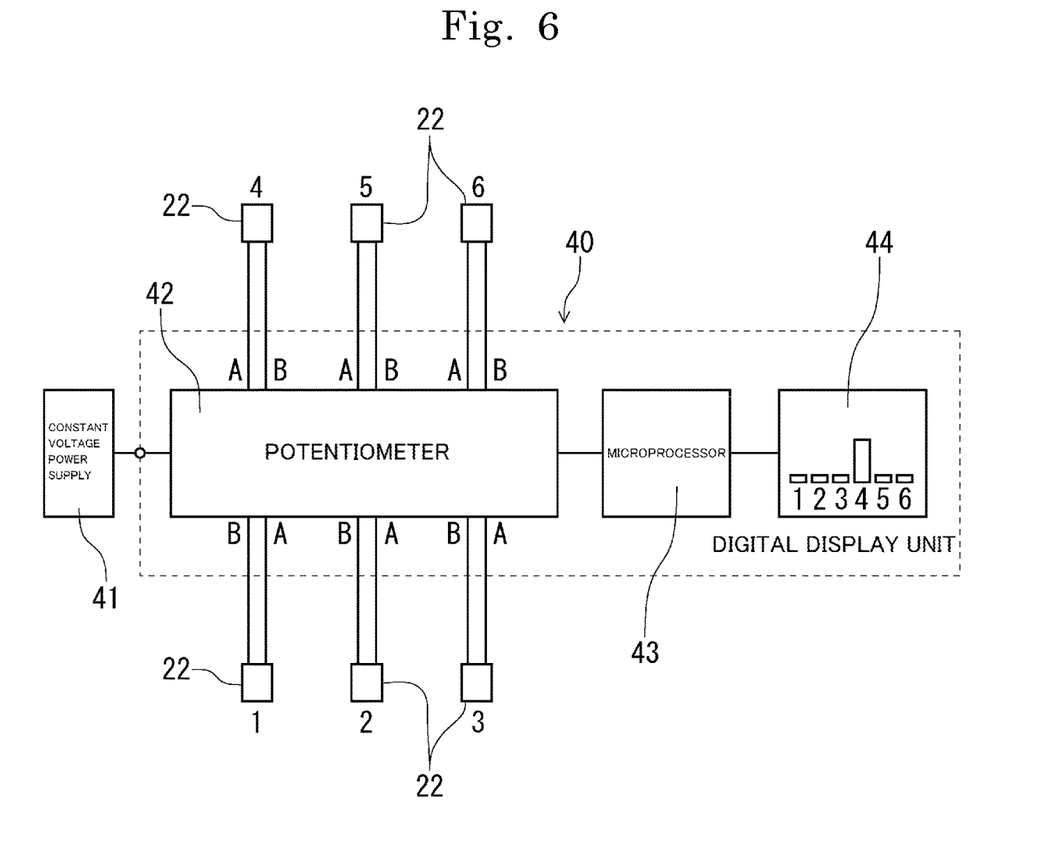
FIG. 6 is a block diagram of a hydrogen gas detection unit.

Depicted in FIG. 6 is a block diagram of a hydrogen gas detection unit (hereinafter referred to a unit main body 40). The unit main body 40 has the hydrogen sensors 22, a constant voltage power supply 41, a digital potentiometer 42, a microprocessor 43, and a digital display unit 44. As depicted in the drawing, specifically, the digital potentiometer 42 on a substrate which controls six hydrogen sensors 22 is wired, and while an output voltage is read by the microprocessor 43, a resistance value of each channel is slid to be adjusted to a voltage as a reference.

As the hydrogen sensor 22 for use, a commercially-available semiconductor sensor capable of outputting an analog signal (0-5 V) is used and, for example, a hot-wire semiconductor hydrogen sensor is used. This hydrogen sensor 22 is a sensor which uses a change of electric conductivity by absorption of a hydrogen gas on the surface of a metal-oxide semiconductor such as tin dioxide ($SnO_2$). In this case, the output voltage becomes logarithmical to the gas concentration to allow high-sensitivity outputs even with low concentration, and therefore this is suitable as a pressure-resistance inspection apparatus. Each hydrogen sensor 22 is connected to the commercially-available digital potentiometer 42 for each channel. The digital potentiometer 42 in the present embodiment is provided with six channels.

Each channel of the digital potentiometer 42 includes a fixed resistor having a wiper contact (not depicted), adjusting a resistance value between an A terminal and a wiper and one between a B terminal and the wiper while the output voltage is read by the microprocessor 43, thereby adjusting the reference voltage of each hydrogen sensor 22.

As in the present embodiment, when the plurality of hydrogen sensors 22 are used, having an adjustment function of adjusting their reference voltages at a certain value via the microprocessor 43 is preferable. This allows equalization of sensitivities of the respective hydrogen sensors 22 and highly-accurate detection of the leaked hydrogen gas.

As means for adjusting the reference voltages at a certain value, according to the above-described unit main body 40, by using the digital potentiometer 42, adjustment of the resistance values can be finely and automatically performed at 256 positions or the like. Compared with the case of using an analog variable resistor, hydrogen leakage can be sensed accurately and early.

Note that the fixed resistance value between the A-B terminals in the present embodiment is set at any value in a range of 0 to 50 kΩ, and the reference voltage is set at 2 V.

In this case, due to the performance of the resolution of the digital potentiometer 42, there is a possibility that it becomes difficult to adjust the reference voltages of six hydrogen sensors 22 at 2 V and a difference occurs among the reference voltages of the respective hydrogen sensors 22. By contrast, when the reference voltages of the respective hydrogen sensors 22 are varied, the microprocessor 43 of the unit main body 40 has a function of adjusting these varied reference voltages each at a voltage for determination and setting a voltage for detecting hydrogen to this voltage for determination.

Specifically, one acquired by the microprocessor 43 increasing the reference voltage of each hydrogen sensor 22 by a predetermined ratio is used as a voltage for determination. In the present example, a voltage value acquired by increasing the reference voltage of each hydrogen sensor 22 by, for example, 5% (a voltage value of 105% of the reference voltage), is taken as a voltage for determination. In this manner, when a voltage for determination for each hydrogen sensor 22 is set and when hydrogen is sensed, a voltage increase from the reference voltage can be sensed by each hydrogen sensor 22 as an increase of the voltage value by a predetermined amount, and therefore it is possible to reliably determine the presence or absence of hydrogen leakage. With this, for example, even when the reference voltage of a specific hydrogen sensor 22 is lower than 2 V and the voltage for determination is also lower than those of the other hydrogen sensors 22, a voltage acquired by increasing at a predetermined ratio is sensed, thereby allowing prevention of erroneous sensing.

While adjustment is performed in the present example by taking one acquired by increasing the reference voltage at a certain ratio (for example, 5%) by each hydrogen sensor 22 as a voltage for determination of each hydrogen sensor 22, adjustment can also be performed so that a common voltage for determination is defined for all hydrogen sensors 22. In this case, in consideration of variations in reference voltage for each hydrogen sensor 22 described above, it is required to reliably prevent erroneous sensing by strictly setting a voltage for determination.

Also, the microprocessor 43 has a function of storing a resistance value measured by the digital potentiometer 42 in the test valve 1 and starting adjustment of the resistance value for the test valve 1 for next inspection based on this resistance value, thereby reducing the time required for setting a reference voltage of each hydrogen sensor 22.

In this manner, by adjusting the resistance value for the next test valve 1 by using the resistance value of the previous test valve 1, processes until the value reaches near the resistance value can be omitted, and a time to be taken for setting a reference voltage of the hydrogen sensor 22 can be reduced, compared with a case in which the measured resistance value is once reset and then a next resistance value is measured. Thus, efficiency of inspection when automated can be enhanced.

When hydrogen leakage occurs from the test valve 1, an output is provided via a signal processing unit (not depicted) in a control unit such as the microprocessor 43 to the digital display unit 44 as a voltage in accordance with the concentration of the hydrogen gas. The digital display unit 44 has an LCD (liquid-crystal display), and the output voltage of each hydrogen sensor 22 is displayed on this LCD as indicator display. Even when the output voltage exceeds the voltage for determination, display is made on the digital display unit 44 as leak sensing. Depicted in FIG. 6 is a state in which the output voltages of the hydrogen sensors 22 of No. 1 to No. 3, No. 5, and No. 6 fall below the voltage for determination, the output voltage of the hydrogen sensor 22 of No. 4 exceeds the voltage for determination, and an occurrence of hydrogen leakage from the test valve 1 is detected at a position where this hydrogen sensor 22 of No. 4 is arranged.

In this manner, while six hydrogen sensors 22 are controlled, external leakage is detected, thereby improving detection capability and also leading to reduction of the detection time and automation.

Note that the digital display unit 44 is any component and it is only required to provide the unit main body 40 directly or indirectly with a function of taking out and displaying the output value of each hydrogen sensor 22.

On the other hand, the jig 24 depicted in FIG. 1 and FIG. 2 is provided for fixing the test valve 1 inside the cover 20. This jig 24 has a clamp member 50 and a plate member 51 capable of clamping, with the flange part 10 of the test valve 1 being in a sealed state.

The plate member 51 is formed in a disk shape where the flange part 10 of the test valve 1 can be mounted, and is integrally fixed to the lower side plate 31. On this plate member 51, one flange part 10 of the test valve 1 is provided so as to be mountable. The plate member 51 and the lower side plate 31 are provided with a through hole 52 depicted in FIG. 5, which can communicate the test valve 1 attached to the inside of the cover 20.

Figure 5:
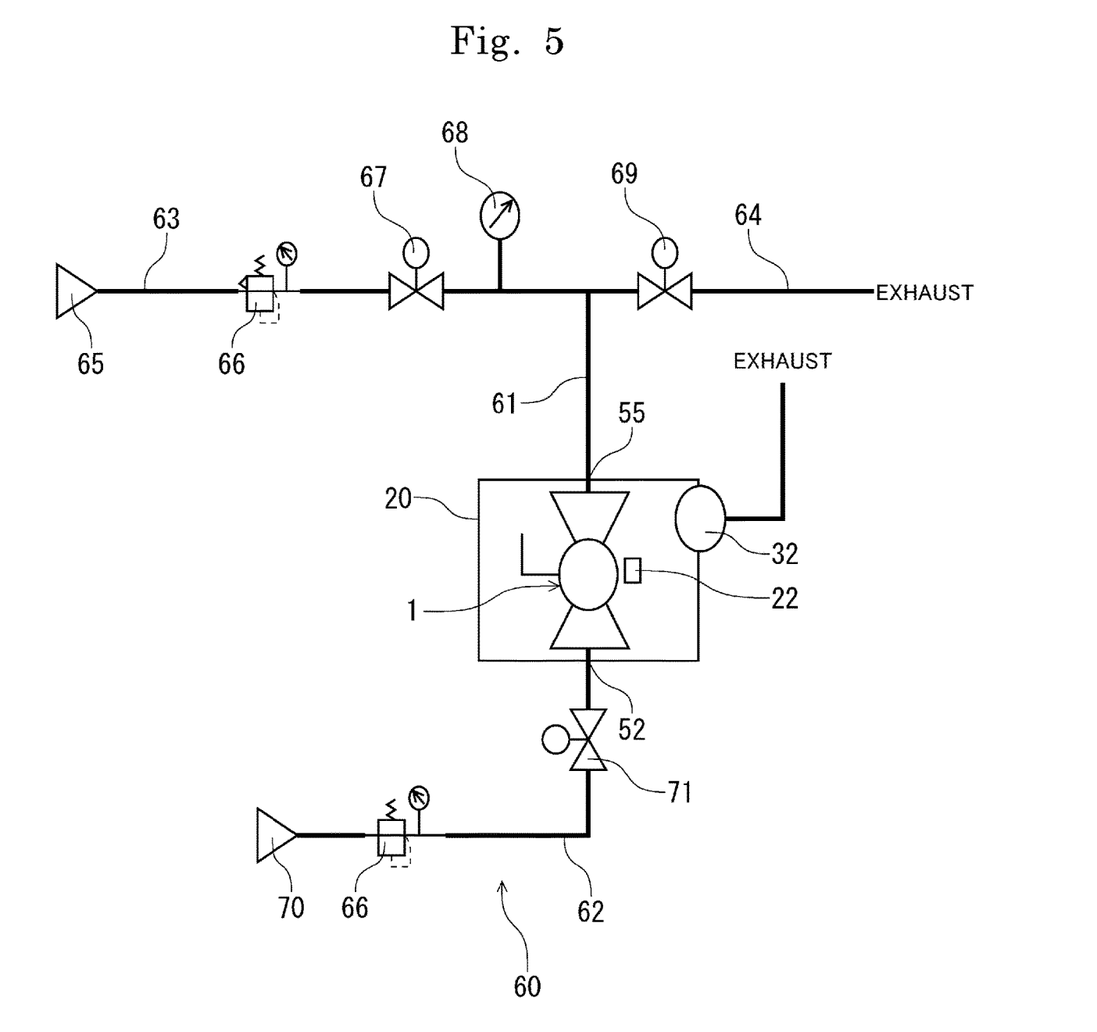
FIG. 5 is a block diagram depicting one example of a pressure-resistance inspection facility using the pressure-resistance inspection apparatus for valves of the present invention.
Figure 7:
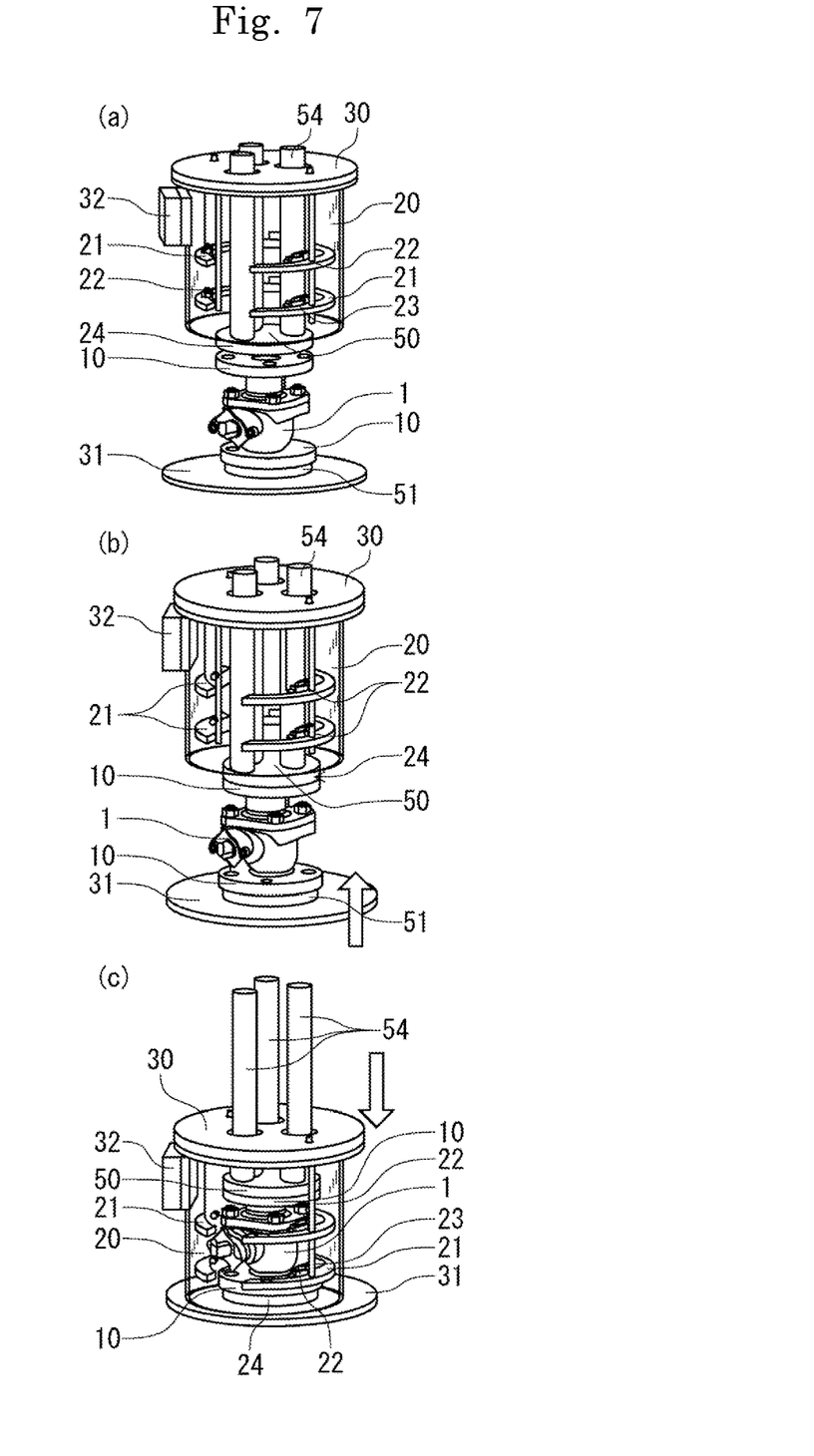
FIG. 7 is a perspective view depicting operation processes of the pressure-resistance inspection apparatus for valves of the present invention.

In FIG. 1 and FIG. 2, the clamp member 50 has a disk-shaped plate board 53 and rod-shaped operation bars 54. The plate board 53 is formed in a disk shape mountable on the flange part 10 of the test valve 1. In this plate board 53 and the upper side plate 30, a communication hole 55 depicted in FIG. 5 is provided, which can communicate the test valve 1 inserted inside the cover 20. As depicted in FIG. 1 and FIG. 2, the operation bars 54 are integrally attached to the plate board 53, and are provided so as to be vertically slidable with respect to the upper side plate 30. When the operation bars 54 are vertically moved, the plate board 53 also integrally operates. When the operation bars 54 are caused to descend, the upper flange part 10 is pressed from above, thereby causing the test valve 1 to be fixed and retained in a space formed by the plate member 51. The number of operation bars 54 is preferably two as depicted in FIG. 1, but three may be provided as depicted in FIG. 7. In this case, with the plate board 53 supported at three points, the upper flange part can be pressed with substantially equal forces while the horizontal state of this plate board is maintained.

The clamp member 50 and the plate member 51 are preferably provided so as to be able to make contact with an end face of the flange part 10 in parallel. Furthermore, on each contact side of the clamp member 50 and the plate member 51 with the flange part 10, an annular seal member not depicted is preferably inserted. In this case, at the time of clamping of the test valve 1 by the jig 24, a leak from a gap is prevented, and an error at the time of pressure-resistance inspection is reduced to be subtle.

Also in a clamped state of the upper and lower flange parts 10, 10 by the jig 24, the cover 20 can be moved to a clamping direction in a reciprocating manner. The cover 20 is provided so that the test valve 1 in the clamped state can be isolated from outside or can be exposed by moving the cover 20 in a reciprocating manner. That is, when the cover 20 is caused to ascend, the test valve 1 is exposed to outside and, in this state, the plate board 53 is caused to ascend via the operation bars 54 to allow the test valve 1 to be removed. On the other hand, when the cover 20 is caused to descend, the test valve 1 is isolated from outside, allowing pressure-resistance inspection to be performed.

In the above-described pressure-resistance inspection apparatus, when the test valve 1 is accommodated inside the cover 20 in a state of being isolated and when each hydrogen sensor 22 is moved to a position close to the outer surface of the joint part between the body part 2 and the cover part 3 as components forming the test valve 1 and the inside of the test valve 1 is filled with the mixture gas of 5% hydrogen and 95% nitrogen, hydrogen leakage from the test valve 1 is detected by any hydrogen sensor 22 to allow pressure-resistance inspection.

Depicted in FIG. 5 is one example of a pressure-resistance inspection facility using the above-described pressure-resistance inspection apparatus for valves as a block diagram. In this pressure-resistance inspection facility 60, with an inspection-side flow path 61 connected to a communication hole 55 side of the pressure-resistance inspection apparatus and a ventilation-side flow path 62 connected to a through hole 52 side thereof, pressure-resistance inspection is performed on the test valve 1.

The inspection-side flow path 61 is branched into a pressurization flow path 63 and an exhaust flow path 64. The pressurization flow path 63 is provided with a hydrogen gas pressure source 65 for pressure-resistance inspection, a regulator 66 for pressure adjustment, a pressurization valve 67 for opening and closing the flow path, and a pressure sensor 68. The exhaust flow path 64 is provided with an exhaust valve 69 for opening and closing the flow path. On the other hand, the ventilation-side flow path 62 is provided with an air pressure source 70 for ventilation of the inside of the valve, the regulator 66 for pressure adjustment, and a ventilation valve 71 for opening and closing the flow path.

Also, the cover 20 has the above-described exhaust fan 32 attached thereto.

Next, the procedure when pressure-resistance inspection is performed by the pressure-resistance inspection apparatus using the above-described pressure-resistance inspection facility 60 is described by using FIG. 7. In FIG. 7, for simplification of the drawing, depiction of the communication hole 55, the through hole 52, and plumbing connected thereto is omitted.

Depicted in FIG. 7(a) is an initial state of the pressure-resistance apparatus and a state in which the cover 20 ascends from the lower side plate 31. In this state, as depicted in the drawing, the test valve 1 is set while one flange part 10 is mounted at a predetermined position of the plate member 51.

As depicted in FIG. 7(b), with the lower side plate 31 caused to ascend to bring the upper flange part 10 into contact with the clamp member 50, the test valve 1 is clamped by the jig 24. In this case, in FIG. 5, only the exhaust valve 69 is in an open state, and the pressurization valve 67 and the ventilation valve 71 are in a closed state.

In FIG. 7(c), the cover (chamber) 20 is caused to descend to bring its lower end into contact with the upper surface of the lower side plate 31 to cause the test valve 1 to be accommodated inside the inspection apparatus in a state of being isolated from outside. Here, the inside of the cover 20 partially communicates outside air as being in a state of being less subjected to influences of outside air, and is therefore in a state of being not completely hermetically sealed. After the descent of the chamber 20, the exhaust valve 69 of FIG. 5 is set in a closed state, and the exhaust fan 32 is operated, thereby discharging a gas such as the mixture gas that may be left from the inside of the chamber 20. Then, the exhaust fan 32 is stopped, and zero adjustment of the six hydrogen sensor 22 is performed by the unit main body 40 of FIG. 6 as described above for sensitivity equalization.

Next, in the state in FIG. 7(c), the servo motors 23 of FIG. 3 are operated to make the hydrogen sensors 22 close to the outer surface of the test valve 1 depicted in FIG. 1 and FIG. 2. In this state, the pressurization valve 67 is set in an open state while the closed state of the exhaust valve 69 of FIG. 5 is maintained, the inside of the test valve 1 is filled with the mixture gas from the communication hole 55 through the inspection-side flow path 61 and is pressurized, and external leakage of hydrogen is detected by the hydrogen sensors 22 within a predetermined inspection time. Here, the rotation angle of each servo motor 23 is adjusted in accordance with the shape and size of the test valve 1, and the hydrogen sensor 22 is made close to a portion where there is a high possibility of occurrence of external leakage of the test valve 1. For example, although not depicted, for a small-sized test valve, the rotation angle of the servo motor 23 is increased to make the hydrogen sensor 22 close to the test valve 1. In this case, with a target range to be detected being narrow, it is not required to use three hydrogen sensors 22 attached to the arc-shaped member 21 on the upper stage side, and the inspection procedure is abridged.

In this state, the output voltage of each hydrogen sensor 22 is read by the unit main body 40 depicted in FIG. 6 to determine whether the presence or absence of external leakage of hydrogen from the test valve 1 to complete the pressure-resistance inspection. After completion of the pressure-resistance inspection, the exhaust fan 32 is operated, and also the servo motors 23 are rotated in reverse to cause the hydrogen sensors 22 to be retracted to their original positions before the pressure-resistance inspection in a departing direction of the test valve 1. Furthermore, the pressurization valve 67 in FIG. 5 is operated to be in a closed state and the exhaust valve 69 is operated to be in an open state, thereby exhausting the mixture gas from the inside of the test valve 1 via the exhaust flow path 64 from the communication hole 55.

Subsequently to this, in FIG. 5, the ventilation valve 71 is caused to be in an open state, thereby blowing air from the air pressure source 70 for ventilation of the inside of the valve via the ventilation-side flow path 62 from the through hole 52 to remove the mixture gas left inside the test valve 1. This prevents the inside of a chamber 20 from being filled with the gas left inside the test valve 1 when the clamp member 50 is removed from the test valve 1 in FIG. 7.

As these described above, after inspection, the mixture gas left inside the chamber 20 is forcibly exhausted by the exhaust fan 32 and the mixture gas left inside the test valve 1 is forcibly exhausted by the exhaust flow path 64. This can discharge this hydrogen gas with diffusibility quickly from the inside of the test valve 1 and the inside of the chamber 20 even when the mixture gas containing hydrogen gas is taken as a search gas as in the present embodiment. Thus, an automation of the pressure-resistance inspection can be made by which the mixture gases are successively supplied to and discharged from inside the different test valves 1, and accurate pressure-resistance inspection results can also be acquired.

After ventilation inside the test valve 1, while the open state of the exhaust valve 69 of FIG. 5 is maintained, the ventilation valve 71 is operated to be in a closed state to cause the inside of the flow path of the pressure-resistance inspection facility 60 to be in an atmospheric pressure state, and then the chamber 20 is caused to ascend as depicted in FIG. 7(b).

Finally, in FIG. 7(a), the clamp member 50 is caused to ascend to release the contact with the upper flange part 10, thereby allowing the test valve 1 to be removed. After removal of the test valve 1, the pressure-resistance inspection apparatus becomes in an initial state, thereby allowing pressure-resistance inspection for another test valve 1 successively as described above. Here, the exhaust fan 32 may be stopped, or the exhaust fan 32 may be continuously operated successively to inspection on another test valve 1.

The valve pressure-resistance inspection in the present embodiment complies with, for example, an air-pressure test in valve-box pressure-resistance inspection defined in JIS B 2003 (General rules for inspection of valves). In the test valve 1 made of cast iron with a nominal pressure of 10 K and a nominal diameter equal to or smaller than 50 A, the test valve 1 in a valve-open state is filled with the above-described mixture gas at a test pressure of 0.6 MPa, and this test pressure is kept for fifteen seconds as a test time to sense the presence or absence of external leakage from the test valve 1 by the hydrogen sensors 22.

Next, the mechanism in the above-described embodiment of the pressure-resistance inspection apparatus for valves of the present invention is described.

The pressure-resistance inspection apparatus for valves of the present invention has the cover 20 which accommodates the test valve 1 in a state of being isolated and hydrogen sensors 22 capable of moving to a position close to the outer surface of the test valve 1 inside this cover 20, and detects external leakage of hydrogen from the test valve 1 by this hydrogen sensors 22. Therefore, at the time of pressure-resistance inspection, even when the type, the nominal pressure, the nominal diameter, and so forth of the valve serving as the test valve 1 are varied to vary the shape and the size, the hydrogen sensors 22 can be reliably made close to a portion where external leakage tends to occur and the occurrence of leakage and its position of occurrence can be quickly detected. In this case, by adjusting the angle of each servo motor 23 to make the hydrogen sensor 22 close to the outer surface of the test valve 1 to the utmost, detection accuracy is improved, and also the detection time is reduced. Since external leakage is checked by mechanical automatic detection including the hydrogen sensors 22, pressure-resistance inspection can be performed with a simple structure by the pressure-resistance inspection facility 60 using the pressure-resistance inspection apparatus without requiring skills, while reducing errors. Also without requiring post-treatment, automation of pressure-resistance inspection achieves efficiency, thereby allowing mass processing and also improving inspection accuracy.

Furthermore, the mixture gas of 5% hydrogen and 95% nitrogen is used as a mixture gas. Thus, when externally leaked, this mixture gas tends to be retained in the retention region R near the joint portion between the body part 2 and the cover part 3 near the flange parts 10, 10 disposed at upper and lower positions and near the attachment portion of the gland member 8. Since three hydrogen sensors 22 are provided to each arc-shaped plate member 21 so as to surround this retention region R, inspection is performed while these six hydrogen sensors 22 in total are controlled, thereby allowing an improvement in capability of detecting leaked hydrogen and also reduction in detection time.

To automate pressure-resistance inspection, for example, while vertical movements of the cover (chamber) 20 having the upper side plate 30 attached thereto and the clamp member 50 are controlled, the plate member 51 (lower side plate 31) having the test valve 1 mounted thereon is successively supplied by a conveyor not depicted to a pressure-resistance inspection performing position provided with these chamber 20 and clamp member 50. This allows mass pressure-resistance inspection in a short time while the pressure-resistance inspection facility is simplified.

Figure 8:
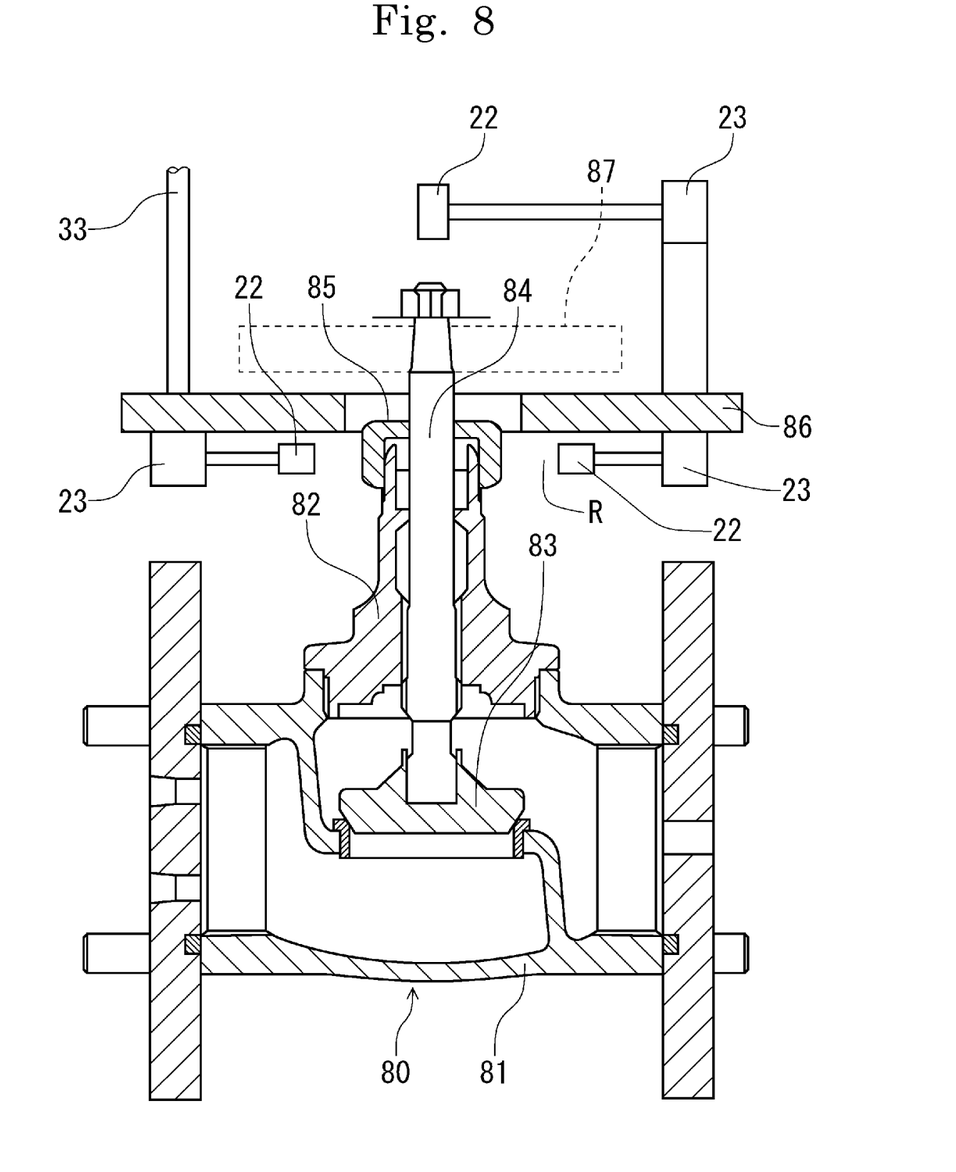
FIG. 8 is a center sectional view of a globe valve.
Figure 9:
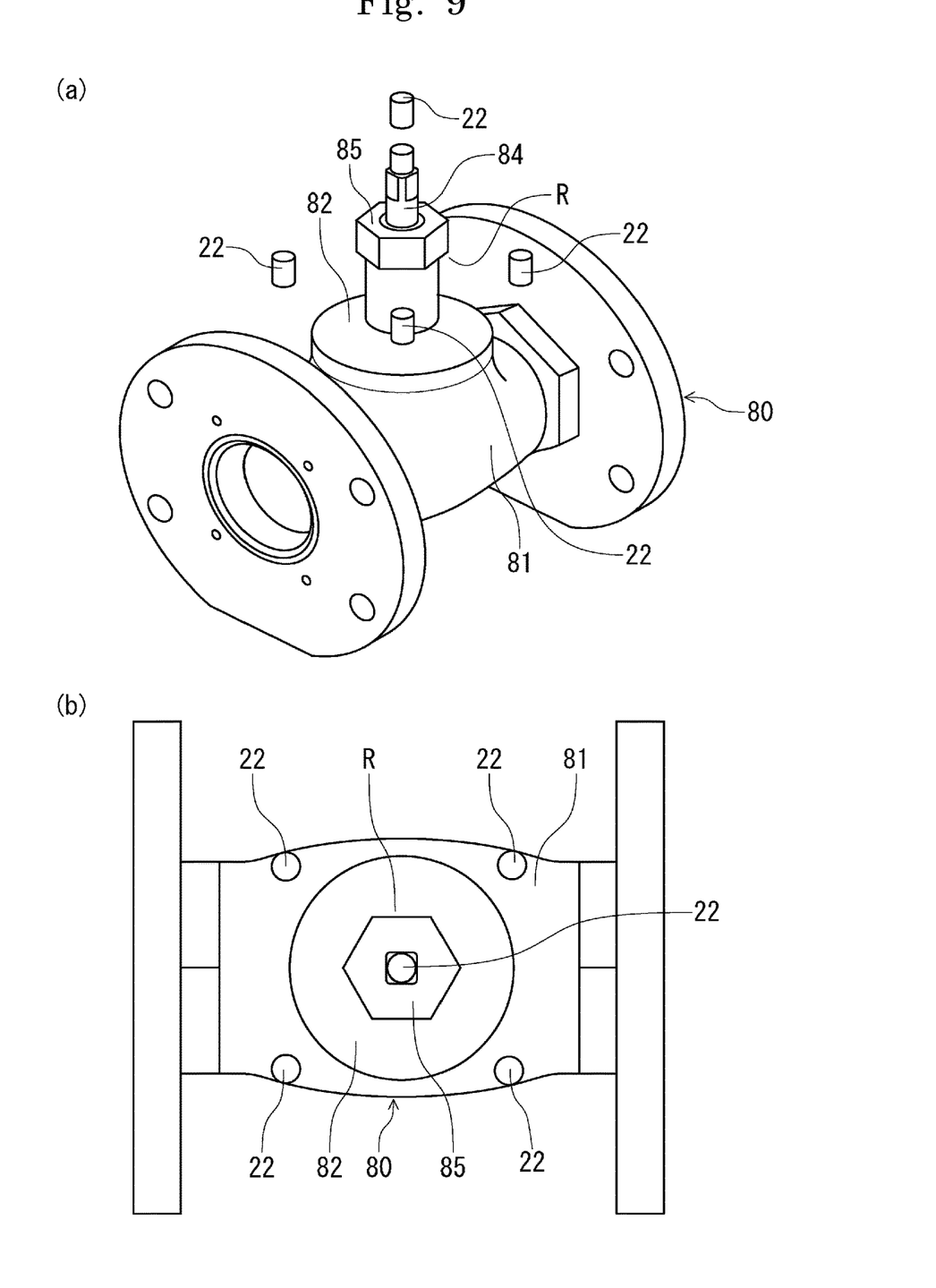
FIG. 9 is a schematic diagram depicting an arrangement state of sensors to the globe valve.

Depicted in FIG. 8 and FIG. 9 is a globe valve 80, which is another test valve for the pressure-resistance inspection apparatus for valves of the present invention. In the drawings, the glove valve 80 has a body part 81 and a bonnet part 82. This bonnet part 82 is inserted into the body part 81, while a stem 84 having a disk 83 is screwed into the bonnet part 82. Above the bonnet part 82, a cap part 85 is screwed. This cap part 85 seals the inside of the bonnet part 82.

In the case of the above-described globe valve 80, there is a high possibility that hydrogen leakage occurs from each of screw parts between the body part 81 and the bonnet part 82 and between the bonnet part 82 and the cap part 85. Thus, when the globe valve 80 is a test valve, it is only required as follows. As depicted in FIG. 8, the valve is mounted on the plate member 51 of FIG. 1 as the stem 84 is in an upwardly-oriented state and, as depicted in FIG. 9(a) and FIG. 9(b), the hydrogen sensor 22 is provided at each of four locations on the periphery of the body part 81 and the bonnet part 82 and at one location on an upper side of the bonnet part 82 and the cap part 85. Each of these hydrogen sensors 22 is made close to an inspection position on the outer surface of the test valve 80 by rotation of the servo motor 23.

In this case, a portion near the screw portion of the cap part 85 is covered with an annular member 86 from above to form the retention region R near a bottom surface side of this annular member 86. With the inner peripheral side of the annular member 86 being provided so as to have a diameter substantially equal to the outer diameter of the cap part 85, hydrogen leaked out mainly from the screw part between the body part 81 and the bonnet part 82 of the globe valve 80 is easily retained in the retention region R, and this hydrogen is sensed by the hydrogen sensors 22 at four locations on a bottom surface side of the annular member 86. Furthermore, by the hydrogen sensor 22 at one location on an upper side from the cap part 85, hydrogen leaked out from mainly from the screw part between the bonnet part 82 and the cap part 85 is sensed.

With this, as with the case of the above-described ball valve 1, pressure-resistance inspection is possible in a state in which the test valve 80 is accommodated inside the cover 20 of FIG. 1. In the present embodiment, the hydrogen sensors 22 are each attached to the servo motor 23 fixed to the annular plate member 86. Note that the stem 84 allows valve opening/closing operation by a nut runner (not depicted) or the like via a center hole of the annulare plate member 86.

In this manner, the number, the mount position, and the height of the hydrogen sensors 22 can be changed as appropriate in accordance with the test valve as a target, thereby allowing pressure-resistance inspection to be appropriately performed in accordance with the test valve of different specifications.

While the embodiments of the present invention have been described in detail in the foregoing, the present invention is not limited to the description of the above embodiments, and can be variously modified in a range not deviating from the spirit of the invention described in claims of the present invention. For example, the present invention can be applied to pressure-resistance inspection for a valve box of any of various valves such as a ball valve, globe valve, gate valve, and check valve, and may also be applied to pressure-resistance inspection for plumbing equipment such as a strainer or any of various pressure vessels.

REFERENCE SIGNS LIST 1 ball valve (test valve)
10 flange part
20 cover
22 hydrogen sensor
23 servo motor
24 jig
32 exhaust fan
40 unit main body
42 digital potentiometer
43 microprocessor
R retention region

The invention claimed is:

1. A pressure-resistance inspection apparatus for valves comprising a cover in which a test valve is accommodated in a state of being isolated without being sealed from outside and a sensor inside this cover and capable of moving in an approaching direction to a position close to an outer surface of the test valve filled with a search gas, this sensor being a gas sensor movable to a retention region of the search gas from the test valve.

2. The pressure-resistance inspection apparatus for valves according to claim 1, wherein the gas sensor is a hydrogen sensor capable of detecting external leakage of hydrogen in a mixture gas of hydrogen and nitrogen formed of a gas containing hydrogen, which is the search gas with which inside of the test valve is filled.

3. The pressure-resistance inspection apparatus for valves according to claim 1, wherein the cover is formed in a cylindrical shape so that flange parts formed on both sides of the test valve formed of a ball valve can be disposed at upper and lower positions, and the gas sensor is provided so as to be movable in a retention region of the search gas on a back surface of the flange part disposed at the upper position.

4. The pressure-resistance inspection apparatus for valves according to claim 1, wherein a stem of the test valve formed of a globe valve is provided so as to be mountable in an upwardly-oriented state, and the gas sensor is provided so as to be movable in a retention region of the search gas near a cap part attached above the glove valve.

5. The pressure-resistance inspection apparatus for valves according to claim 1, wherein the apparatus has a flange-shaped jig by which the flange parts formed on both sides of the test valve are clamped in a sealed state, and the cover is provided so as to be able to make reciprocating movements in a clamping direction so as to be able to isolate the test valve from outside or expose the test valve to outside, with a clamped state of the flange parts by the jig.

6. The pressure-resistance inspection apparatus for valves according to claim 1, wherein the gas sensor has attached thereto a rotation driving device capable of making angle adjustment in a direction of approaching or departing from the test valve.

7. The pressure-resistance inspection apparatus for valves according to claim 1, wherein the cover is provided with an exhaust fan which exhausts a gas inside the cover.

8. A hydrogen gas detection unit for use in the pressure-resistance inspection apparatus for valves according to claim 1, wherein a plurality of hydrogen sensors are connected to a digital potentiometer, and the unit has an adjustment function of adjusting reference voltages of these hydrogen sensors at a certain value via a microprocessor.

9. The hydrogen gas detection unit according to claim 8, wherein the microprocessor has a function of setting a voltage for determination by, when the reference voltages of the respective hydrogen sensors are varied, adjusting each of these varied variable voltages with the digital potentiometer, and setting a voltage for sensing hydrogen for this voltage for determination.

10. The hydrogen gas detection unit according to claim 8, wherein the microprocessor has a function of storing a resistance value of the test valve measured by the digital potentiometer, starting adjustment of the resistance value for a next test valve for inspection based on this resistance value, thereby reducing a time to be taken for setting the reference voltage of each of the hydrogen sensors.

11. A pressure-resistance inspection method for valves, in which a test valve is accommodated in a cover in a state of being isolated without being sealed from outside, a gas sensor is moved in an approaching direction to a retention region of a search gas, which is a position close to an outer surface of a joint part of components serving as this test valve, and, when the test valve is filled with the search gas, external leakage of the search gas from the test valve is detected by the gas sensor.

12. The pressure-resistance inspection method for valves according to claim 11, wherein the gas sensor is a hydrogen sensor capable of detecting external leakage of hydrogen in a mixture gas of hydrogen and nitrogen formed of a gas containing hydrogen, which is the search gas with which inside of the test valve is filled.

* * * * *